(12) United States Patent
Jehin

(10) Patent No.: US 6,604,640 B1
(45) Date of Patent: Aug. 12, 2003

(54) STORAGE SYSTEM

(75) Inventor: Denis Jehin, Liège (BE)

(73) Assignee: Stow International N.V., Dottignies (BE)

( * ) Notice: Subject to any disclaimer, the term of this patent is extended or adjusted under 35 U.S.C. 154(b) by 0 days.

(21) Appl. No.: 10/159,716

(22) Filed: May 31, 2002

(51) Int. Cl.⁷ .................................................. A47F 5/00
(52) U.S. Cl. ........................ 211/191; 211/189; 52/167.3
(58) Field of Search ................................. 211/190, 191, 211/189, 187, 26; 52/167.3, 167.1

(56) References Cited

U.S. PATENT DOCUMENTS

| | | | | |
|---|---|---|---|---|
| 2,918,176 A | * | 12/1959 | Bell et al. | |
| 4,074,811 A | * | 2/1978 | Filak | 211/191 |
| 4,116,343 A | * | 9/1978 | Hall | 211/191 X |
| 4,409,765 A | * | 10/1983 | Pall | 52/167.3 |
| 5,148,642 A | * | 9/1992 | Plumier et al. | 52/167.1 |
| 5,330,066 A | * | 7/1994 | Carroll | 211/189 |
| 5,370,239 A | * | 12/1994 | Kidaloski et al. | 211/189 X |

* cited by examiner

*Primary Examiner*—Robert W. Gibson, Jr.
(74) *Attorney, Agent, or Firm*—Hovey Williams LLP

(57) ABSTRACT

The storage system comprises a metal structure in which vertical column are connected by means of diagonal members and linking members, whereby at least two diagonal members are provided with at least one dissipative zone, while the linking members are adapted for undergoing elastic deformation when at least one dissipative zone is undergoing a plastic stretching.

26 Claims, 6 Drawing Sheets

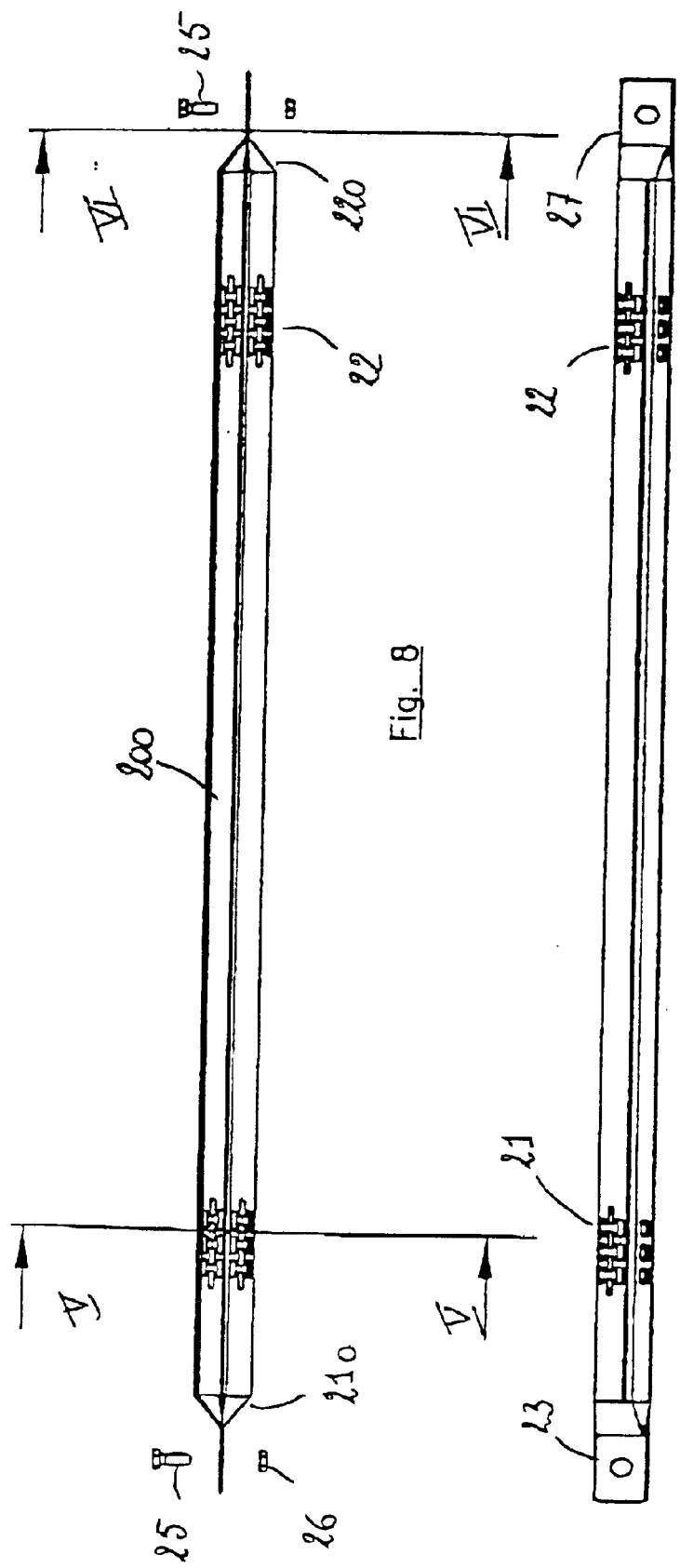

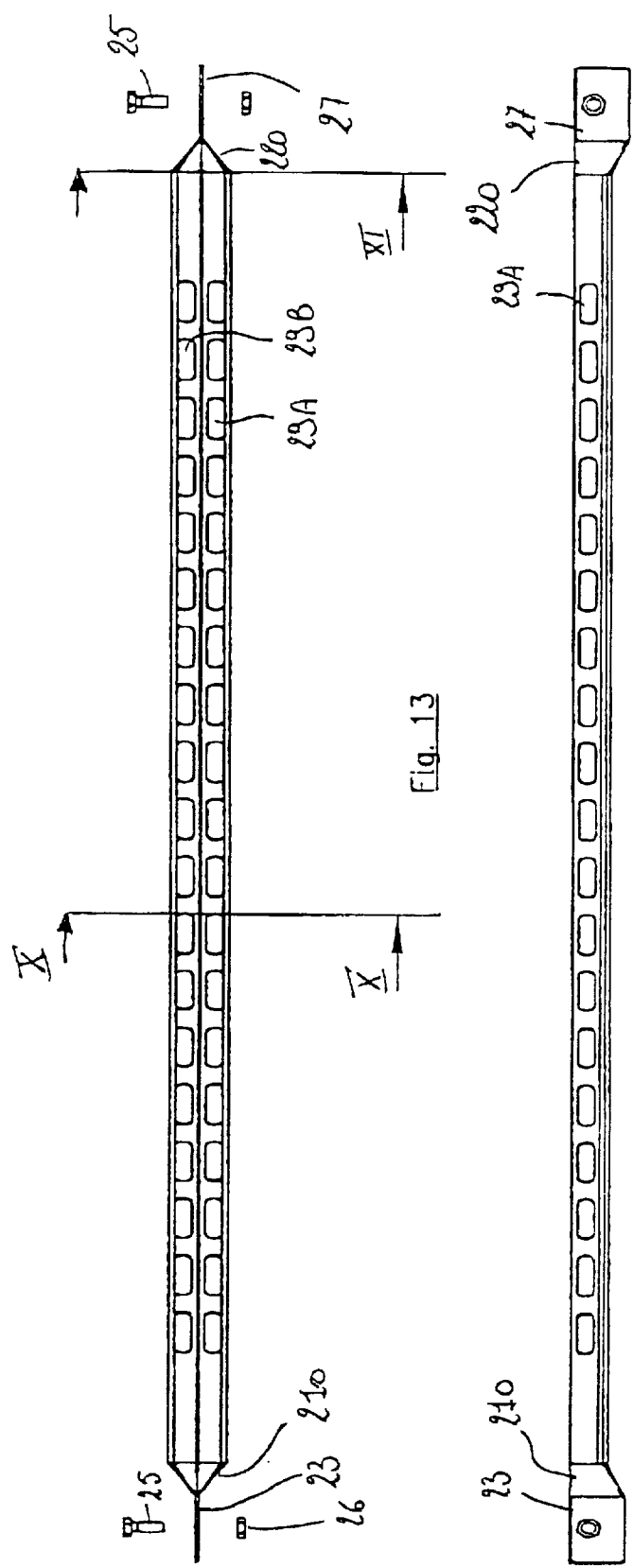

STORAGE SYSTEM

FIELD OF THE INVENTION

The invention relates to a storage system comprising a metal structure, such as a rack. Such storage system is used for stocking at different level of the structure various products. In order to gain place, such storage system enables to stock various product at level up to 3 meters, 5 meters, 8 meters, 15 meters, 20 meters, 30 meters, 40 meters or even more from the ground.

When such a storage system is submitted to seismic vibrations, the risk of collapse of said storage system is high, meaning risks of injuries for people, risk of damaging stored products due to their falls and loss of time, as after a severe seismic vibration, the complete structure needs to be replaced for safety purposes. Furthermore, due to the seismic vibration, efforts are exerted in the concrete floor or platform on which the vertical column are fixed, this efforts leading to damages around the fixation points of the vertical columns.

THE PRIOR ART

Many systems have already been proposed for building in order to limit the damage caused by earthquake. For example, U.S. Pat. No. 5,148,642 teaches the use of horizontal girders connecting vertical column, said girders being provided with dissipative zones adjacent to their ends attached to vertical columns, so as to form plastic hinge.

The system of U.S. Pat. No. 5,148,642 requires a long time for its erection, as the system is not easily mounted.

The system of U.S. Pat. No. 5,148,642 comprising plastic hinge horizontal girders does not provide a good solution for storage system, as in case such a structure would have been used, after an earthquake, all the stored product would need to be removed from the storage system for replacing at least the majority of the horizontal girders. This means a cost full and time consuming operation.

The invention relates to a storage system which is able to resist to seismic vibration, and which resistance can easily be restored after a seismic vibration without or with a limited need to displace the stored product out of the storage structure. The storage system of the invention enables thus to minimize the displacement/removal of product out of the structure for replacing one or more diagonal members.

BRIEF DESCRIPTION OF THE INVENTION

The invention relates to a storage system comprising a metal structure comprising a series of vertical columns linked the one to the other by a series of horizontal members acting as support for the products to be stored or for plates on which are placed the products to be stored, and a series of diagonal members directly connected to vertical columns by means of connecting elements pushing each a face of a portion of a diagonal member against a face of a column. In the storage system of the invention, at least two diagonal members are provided with at least one dissipative zone being capable of undergoing plastic stretching and functioning as means for providing resistance to seismic vibrations, a first diagonal member having a first end attached to a first vertical member and extending between said ends, a second end attached to the second vertical end and a central part provided with at least one dissipative zone, while a second diagonal member has a first and attached to said second vertical member, a second end attached to said first vertical end and a central part provided with at least one dissipative zone and extending between said ends, a first linking means connects a portion of the first column adjacent to the first end of the first diagonal member to a portion of the second vertical column adjacent to the first end of the second diagonal member, while a second linking means connects a portion of the second vertical column adjacent to the second end of the first diagonal to a portion of the first vertical column adjacent to the second end of the second diagonal, said ends of the first and second diagonal members are reinforced so that when a dissipative zone of a central part of a diagonal member is submitted to a plastic deformation, the ends of said diagonal member are only submitted to an elastic deformation and are not detached from the vertical columns, and the linking means are adapted for undergoing elastic deformation when at least one dissipative zone is undergoing a plastic stretching.

The use of linking means undergoing elastic deformation while one or the two diagonal members undergo a plastic stretching is required for the transfer of efforts to the diagonal members during an earthquake.

Advantageously, the diagonal members are provided with at least one dissipative zone undergoing plastic stretching when submitted to a seismic vibration with an effort or force higher than a predetermined effort or force, while the linking means are not provided with dissipative zone undergoing plastic deformation when submitted to a seismic vibration with an effort or force equal to about 1.2 times said predetermined effort or force, preferably to about 1.3 times said predetermined effort or force.

According to an embodiment, two adjacent columns are linked the one to the other by at least four diagonal members provided with at least one dissipative zone and by at least three linking means connecting one end of a diagonal member to an end of another diagonal member. The diagonal members form crosses, the axis of which are not vertical, nor horizontal. Said axis form for example an angle of 15° to 75°, advantageously from 30 to 60° with respect to a horizontal plane. When several crosses (formed by independent diagonal members) connect two adjacent vertical columns, one single linking element or profile is often sufficient for transmitting the effort from one cross to the underneath cross.

Preferably, all the diagonal members are provided with at least one dissipative zone. For example, each diagonal member is provided with at least two (or more, such as three, four, etc.) dissipative zones distant from each other. According to a detail of a possible embodiment, the diagonal member is a profile, the central portion of which is provided with successive openings so as to define a substantially continuous dissipative zone extending along the central portion of the diagonal member.

According to an embodiment, each diagonal member is a profile having a first end connected to a first vertical column, a second end connected to a second vertical column, and a longitudinal portion extending between said ends, whereby said ends are flattened and have a total thickness which is greater than the thickness of the longitudinal portion, advantageously each end corresponds to a folded portion of the profile, so that said end is flattened and have a total thickness at least equal to about twice the thickness of the central part of the diagonal member, most preferably at least equal to about three times the thickness of the central part of the diagonal member.

For example, the diagonal member is formed of a metal, the dissipative zone of a diagonal member being formed by removing materials from the central part of the diagonal member at the place of said dissipative zone. For example, the diagonal member has a longitudinal central part with a cross section, whereby the dissipative zone is formed by removing at least 25% (such as from 25% to 50%, preferably about 30%) of the material in the cross section of one or more portions of the central part.

According to an embodiment, the diagonal member has a longitudinal central with a defined length, whereby the dissipative zone extends on a major portion of the central part.

According to possible diagonal member, the diagonal member is:
- a longitudinal profile, the ends of which are folded portion of the profile, said portion being folded around at least an axis parallel to the longitudinal direction of the profile; or
- the profile has at least two longitudinal elements connected there between along a folding line, whereby said two longitudinal elements define there between an angle from 15° to 175° in the longitudinal portion extending between the two ends, while at said two ends, said two longitudinal elements are flattened so as to extend adjacent to each other; or
- a profile having a first end connected to a first vertical column, a second end connected to a second vertical column, and a central longitudinal portion extending between said ends, whereby the profile has at least two longitudinal elements connected there between by a longitudinal connecting elements, said two longitudinal elements being at least partly distant from each other in the central longitudinal portion, while being adjacent to each other at the ends.

Most preferably, each end of the diagonal member is flat and connected to a column by means of a single connecting element extending between said end and the column. Said single connecting means is for example a bolt working with a nut, a rod working with abutments means (at least one being mobile), screw, etc. By using one single connecting means for connecting one end to a vertical column, the placement and removal of a diagonal member is easy and rapid, such a easy and rapid removal and replacement being important for storage system, so as to be able to replace quickly diagonal members, the dissipative zone thereof having been plastically stretched after an earthquake. Such a rapid replacement is necessary for ensuring that in case of an earthquake, the diagonal members undergoing plastic deformation can be replaced well before another earthquake occurs, so as to reestablish the properties to resist to seismic vibrations. Moreover, when using two or three bolts for attaching one end of a diagonal member to a vertical member, a possible deformation of the end of the diagonal member will render more difficult the replacement of the diagonal member due to possible tension in one or more bolts.

According to an advantageous embodiment, the dissipative zone is a zone of the longitudinal central part which is provided with openings, whereby each opening having a maximum length measured parallel to the longitudinal direction of the central part and a maximum width measured perpendicular to said longitudinal direction, the maximum length being at least equal to the maximum width, such as at least equal to 1,5 times the maximum width for example equal to 2, 3, 4 times the maximum width. Preferably, the maximum length is lower than 5 times the maximum width.

According to preferred embodiment, the diagonal members with dissipative zone are located in the structure at least near the bottom of the structure, i.e. near the ground. According to a specific embodiment, the structure comprises only diagonal members with dissipative zone near the ground, such as up to height of 3 m, preferably up to a height of 2 meters.

The invention relates also to a storage system comprising members with dissipative zone(s), especially a storage system of the invention, in which at least one dissipative zone of the diagonal member is associated with a means for facilitating the detection of a plastic deformation.

Preferably, the means for facilitating the detection of a plastic deformation is selected among the group consisting of marks distant from each other by a predetermined distance, films which can change of appearance when submitted to a plastic deformation, tapes, wires, sliding means, sliding means comprising one element connected to a first portion of the dissipative zone and another element connected to another portion of the dissipative zone, whereby the first sliding element is adapted to slide with respect to the second sliding element, and combinations thereof.

The invention further relates to a process for storing products in a storage system comprising a metal structure comprising a series of vertical column linked the one to the other by a series of horizontal members, and a series of diagonal members directly connected to vertical columns by means of connecting elements pushing each a face of a portion of a diagonal member against a face of a column, whereby at least two diagonal members are provided with at least one dissipative zone being capable of undergoing plastic stretching and functioning as means for providing resistance to seismic vibrations, a first diagonal member having a first end attached to a first vertical member and extending between said ends, a second end attached to the second vertical end and a central part provided with at least one dissipative zone, while a second diagonal member has a first end attached to said second vertical member, a second end attached to said first vertical end and a central part provided with at least one dissipative zone and extending between said ends, whereby a first linking means connects the first end of the first diagonal member to the first end of the second diagonal member, while a second linking means connects the second end of the first diagonal to the second end of the second diagonal, whereby said ends of the first and second diagonal members are reinforced so that when a dissipative zone of a central part of a diagonal member is submitted to a plastic deformation, the ends of said diagonal member are only submitted to an elastic deformation and are not detached from the vertical columns, and whereby the linking means are adapted for undergoing elastic deformation when at least one dissipative zone is undergoing a plastic stretching, in which after a seismic vibration, the diagonal members undergoing a plastic deformation are replaced by new diagonal members provided with at least one dissipative zone.

Advantageously, the diagonal members are provided with at least one dissipative zone undergoing plastic stretching when submitted to a seismic vibration with an effort or force higher than a predetermined effort or force, while the horizontal members are not provided with dissipative zone undergoing plastic deformation when submitted to a seismic vibration with an effort or force at least equal to 1.2 times (preferably at least equal to 1.3 times ) said predetermined effort or force. The process of the invention uses preferably a storage system of the invention as disclosed here above.

In the process of the invention, when the storage system is submitted to a seismic vibration with an effort or force greater than a predetermined effort or force, the diagonal members provided with at least one dissipative zone are stretched in said dissipative zone so as to dissipate in said dissipative zones energy of the seismic vibrations, whereby preventing the collapse of the metal structure. After the metal structure being submitted to seismic vibrations causing a plastic stretching of the diagonal members provided with at least one dissipative zone, said diagonal members are replaced by new diagonal members provided with at least one dissipative zone.

BRIEF DESCRIPTION OF THE DRAWINGS

FIGS. 7 and 8 are longitudinal side and upper views of the diagonal member of FIG. 4;

FIGS. 9 to 13 are views similar to the views of FIGS. 4 to 8, but for another embodiment of a diagonal member.

DESCRIPTION OF PREFERRED EMBODIMENTS

Figure 1:
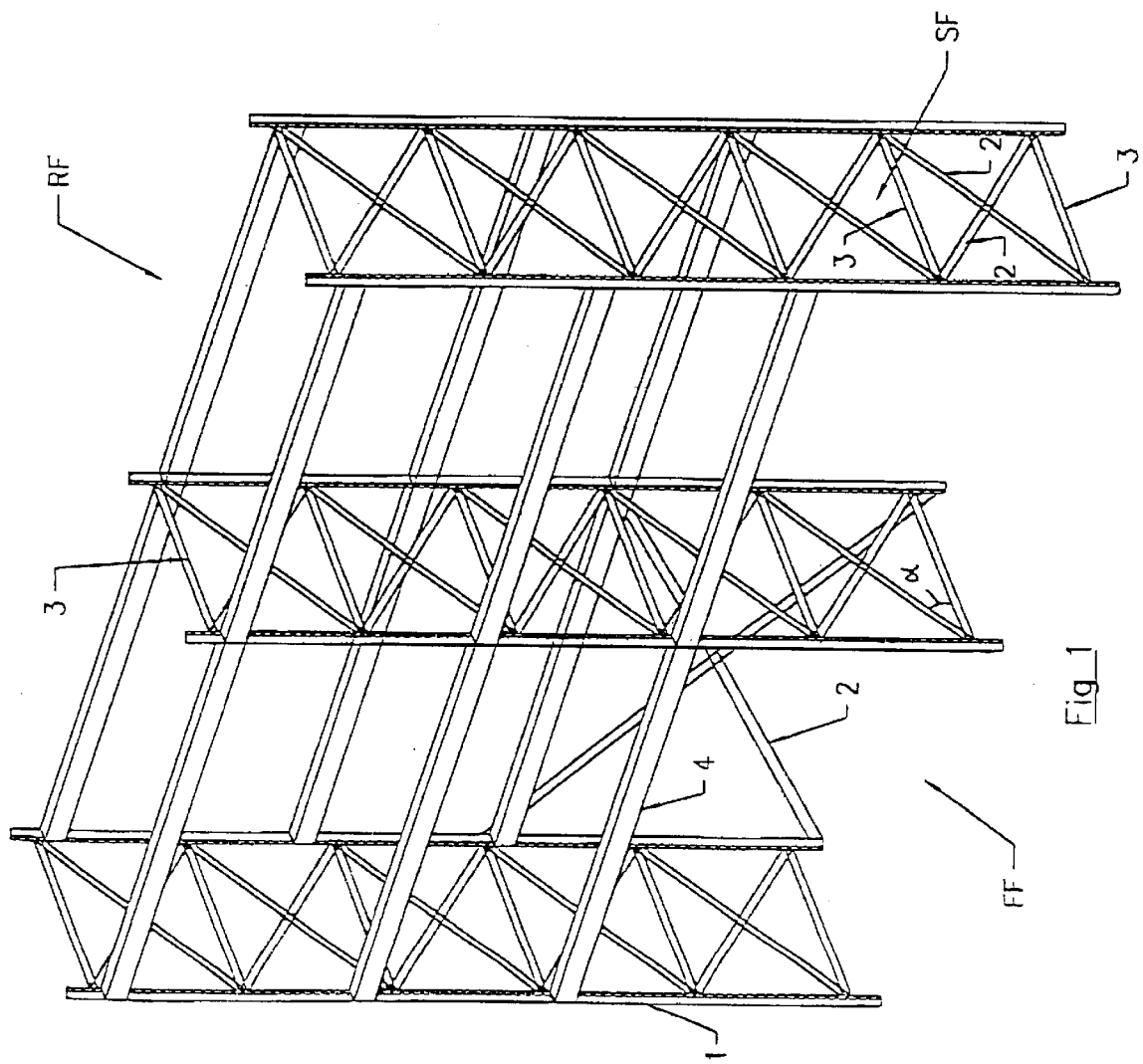
FIG. 1 is a schematic partial view in perspective of a storage system of the invention.

The storage system of FIG. 1 comprises:

a series of vertical columns 1;

a series of longitudinal (horizontal) members 3 extending between the columns 1;

a series of supporting elements 4 (such as planes or beams), said supporting elements serving as support for the products to be stored;

of the series of diagonal members 2 (only a few diagonal members 3 being represented) extending between the columns of the rear face RF of the structure and the side face SF of the structure, and possibly between columns of the rear face RF and columns of the front face FF.

The columns, the longitudinal members and the diagonal members are made of metal (the same or not), advantageously of steel.

The columns 1, the supporting elements 4 and the longitudinal members 3 are designed so as to be submitted only to elastic deformation during seismic vibrations.

Each diagonal members 2 are provided with two dissipative zones 21,22. The diagonal members have a first flat end 23 provided with a hole 24 so as to connect said end to a column 1 by means of a bolt 2 and a screw 26, and a second flat end 27 provided with a hole 28 so as to connect said end to another column 1 by means of a bolt 25 and a screw 26.

Figure 2:
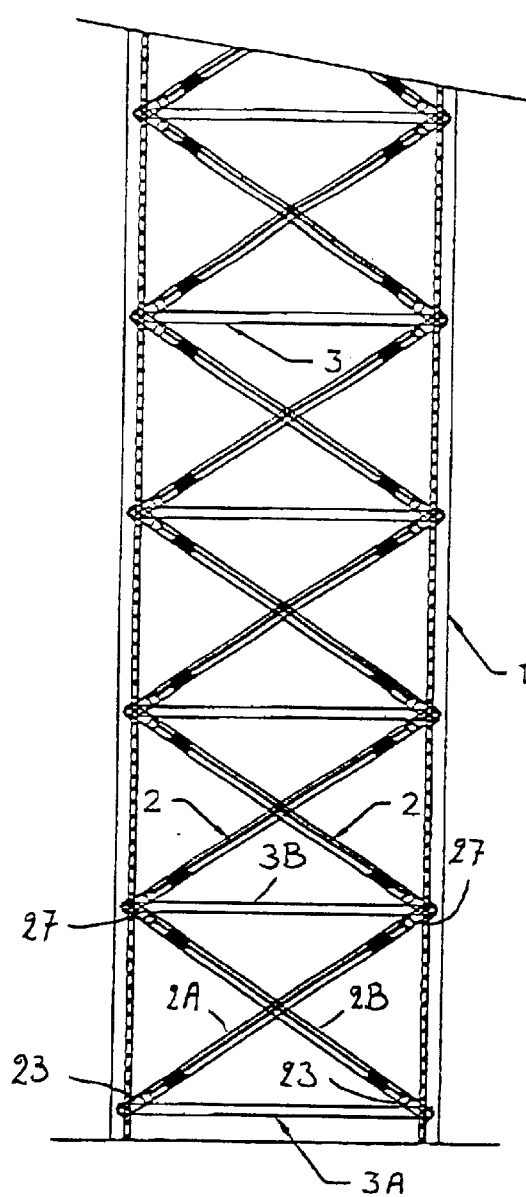
FIG. 2 is a view of detail of a part of the storage system of FIG. 1.

The diagonal members 2 form a series of crosses between the two column 1 (see FIG. 2).

Figure 3:
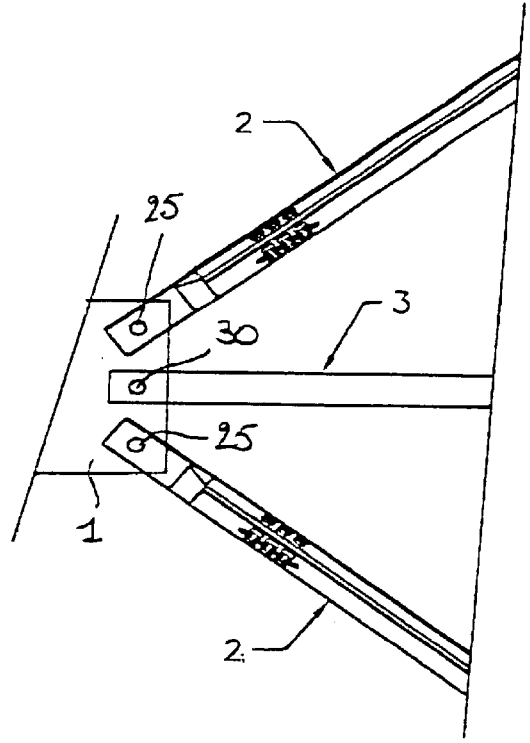
FIG. 3 is a view of a detail of FIG. 2.

As it can be seen from FIGS. 2 and 3, a first horizontal linking means 3A connects a portion of the first column 1 adjacent to the first end 23 of the first diagonal member 2A to a portion of the second vertical column adjacent to the first end 23 of the second diagonal member 2B, while a second liking means 3B connects a portion of the second vertical column 4 adjacent to the second end 27 of the first diagonal 2A to a portion of the first vertical column adjacent to the second end 27 of the second diagonal 2B.

The diagonal members provided with dissipative zone (FIG. 4) are made by folding and/or profiling and/or extruding a metal plate having a well defined mechanical characteristics, such as force at which the plastic deformation starts and force at which a rupture of the metal plate appears. Before and/or after folding the plate, the plate or the diagonal member is provided with openings 29 for forming the dissipative zones 21,22.

The diagonal member 2 comprises:

a central longitudinal portion 200 with a substantially "S" cross profile, said portion having an upper inclined face 201, a right end flange 202 attached to the face 201, a lower inclined face 203 ending with a left flange 204, and a central face 205 extending between the faces 201 and 203 (the central face extending in a vertical plane, when the diagonal member extends between two vertical columns);

an flat end portion 23 consisting of the folding of the metal plate so that three flat portions of the plate contact each other and so that the total thickness of said flat end is about 3 times the thickness of the plate;

an flat end portion 27 consisting of the folding of the metal plate so that three flat portions of the plate contact each other and so that the total thickness of said flat end is about 3 times the thickness of the plate;

transition portions 210,220 between the central portion 200 and the end flat portions 23,27, said transition portions being adapted for passing from the "S" shape of the central longitudinal portion 200 to the flat shape of the end portions 23,27.

The central longitudinal portion 200 is provided with two weakening zones 21,22 suitable for enabling plastic deformation. Each weakening zone 21,22 is obtained by providing the plate with openings 29 of substantially rectangular shape. The opening 29 extends along the upper face 201, the lower face 203 and the central face 205.

Figure 4:
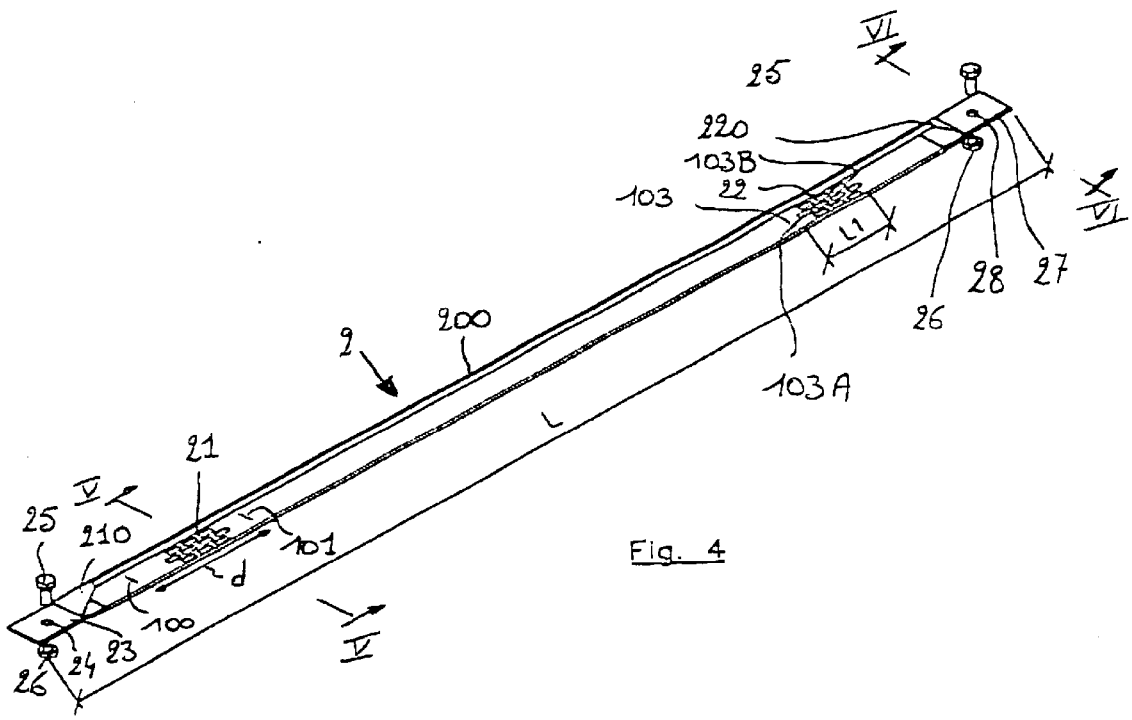
FIG. 4 is a view in perspective of a diagonal member.
Figure 5:
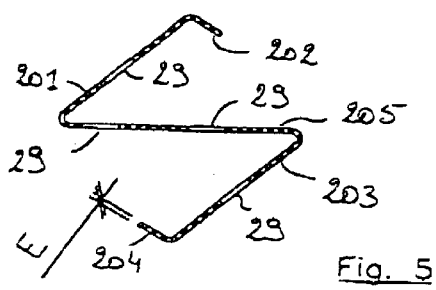
FIGS. 5 and 6 are enlarged cross section views of the diagonal member along the lines V—V and VI—VI.
Figure 6:
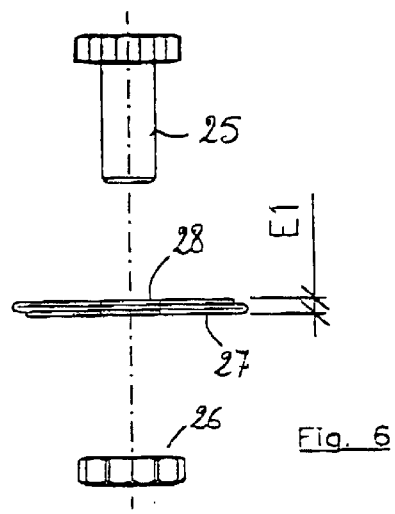

The openings 29 of each weakening zone or plastic zone 21,22 are located between the transition zones 210,220 and not in said zones. In the embodiment of FIG. 4, the weakening or plastic zones extend along a portion of the central part 200 with a same length L1. The dissipative zones are thus distant from the holes 24,28, and thus from the ends 23,27, the latter as well as the transition parts 210,220 being submitted to no elastic deformation or limited elastic deformation during high plastic deformation of the dissipative zones.

The diagonal member 2 is made of a metal material, such as an alloy, steel, aluminium, etc., having well defined characteristics, for example having a maximum elastic deformation within a defined range (for example comprised between 100% and 120% of a predetermined elastic deformation). In the weakening zones 21,22, at least about 25% (for example about 30%) of the metal is removed from the plate. It means that the quantity of material present in cross section or the cross section surface in the weakening zones is at least 25% (for example about 30%) lower than the quantity of material present in cross section or the cross section surface in zones which are not weakened, such as in the ends.

At the flat ends 23,27, due to the folding of the metal plate, the flat ends have a thickness E1 corresponding to three times the thickness of the plate E. This increase of thickness of the ends of the diagonal member enables to prevent the risk of deformation of the holes 24,28 when the member is submitted to forces, as well as to prevent risk of rupture of said flat ends, when the member 2 is submitted to a traction effort.

Each end of the diagonal members, as well as the longitudinal member 3 is connected to a vertical column by means of a single bolt 25 and screw 26. Different bolts 30 and screws are used for attaching the end of the linking profiles 3 to the columns 1. (see FIG. 3) This enables an easy removal or replacement of one or more diagonal members.

This enables also that a bolt is only submitted to an effort excited in one single profile (diagonal member 2 or linking profile 3).

The diagonal members 2 are provided with means for facilitating the detection of a plastic stretching. Such a means is for example two marking lines 100,101 which are distant from each other of a predetermined distance, whereby in case of a plastic stretching, said distance "d" will be higher than the predetermined distance. The marking lines 100,101 are located with respect to a dissipative zone (21), respectively towards the end 23 and towards the end 27.

As other possible means for easily detecting whether a dissipative zone has been submitted to a plastic stretching, the diagonal member can be provided with a ranking line 103 extending through a dissipative zone (22) as well partly in zones not provided to plastic dissipative properties adjacent to zone 22 (i.e. zones undergoing only elastic deformation, when the zone 22 undergoes a plastic deformation). When the zone 22 will undergo a plastic deformation, the marking line 103 will no more be a straight line. Possibly for having a still easier control of the plastic stretching of the zone 22, a wire is attached to the ends 103A,103B of the line 103, said ends being located outside the dissipative zone 22. The wire is then not attached to the dissipative zone 22. In case of a plastic stretching of the dissipative zone 22, the line 103 will no more exactly follow the wire (able to undergo elastic or plastic deformation).

As still other possible means for easily controlling whether a dissipative zone undergoes a plastic deformation is to provide the dissipative zone with a painting layer able to be cracked when submitted to a plastic deformation.

When the structure of the storage system of FIG. 1 is submitted to earthquake vibrations, the diagonal members 2 are submitted to traction, i.e. to an elongation. Deformed diagonal members 2 are easily detected, whereby it is easy to detect the members to be replaced. For safety purposes, it is better to replace all the members 2 in case one member 2 has been submitted to a deformation (elongation) after an earthquake.

When said traction force exerted on a diagonal member 2 is higher than a predetermined value, the diagonal member 2 is submitted to a plastic deformation (stretching) at the weakening plastic zones 21,22, whereby enabling earthquake energy to be dissipated and whereby preventing a collapsing of the structure during an earthquake.

The diagonal members are designed so that all the diagonal members with weakening zones 21,22 are adapted for following a plastic deformation when submitted to a force higher than substantially a same predetermined value, while being not submitted to plastic deformation, for force lower to said same predetermined value.

The columns 1 and the longitudinal members 3,4 are made for being submitted to only elastic deformation when submitted to force at least equal to said predetermined value, for example for force at least equal to 1.3 times said predetermined value.

After an earthquake, the diagonal members which have been submitted to a plastic deformation are replaced by new diagonal members, i.e. diagonal members which have still not been submitted to plastic deformation.

Figure 9:
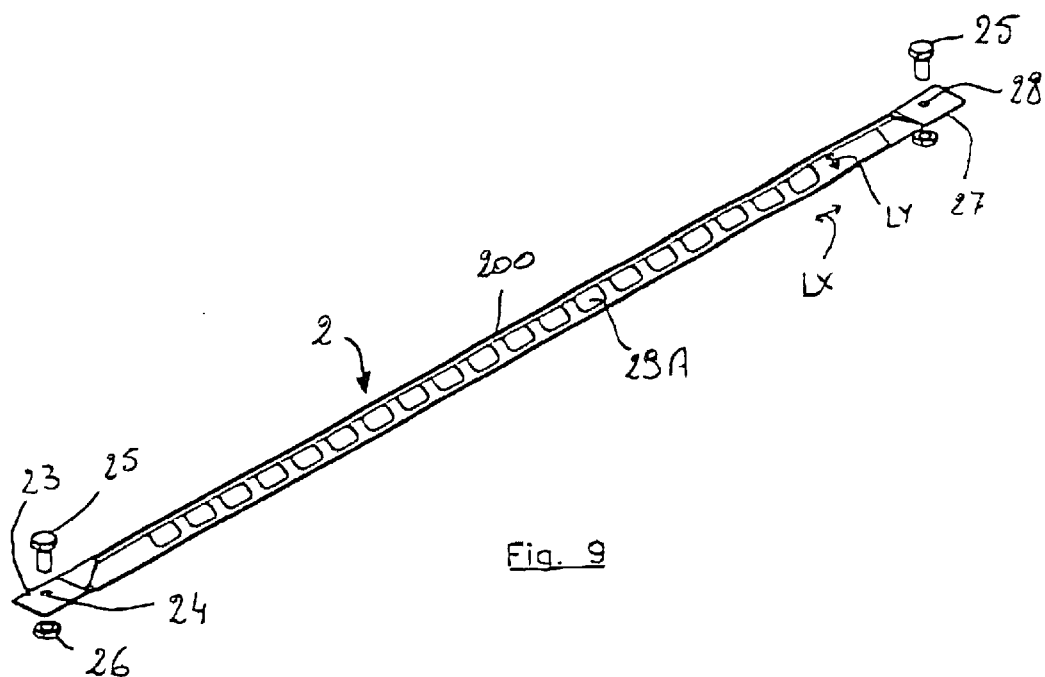
Figure 10:
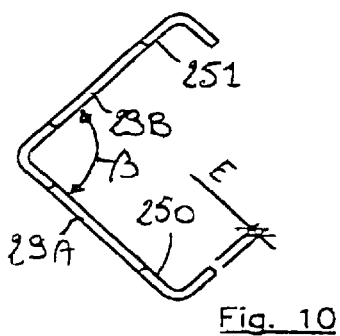
Figure 11:
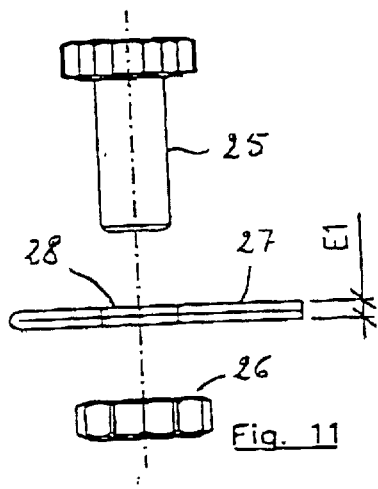

FIG. 9 is a perspective view of another embodiment of diagonal member similar to that shown in FIG. 4, except that the central portion 200 is provided with two series of successive openings 29A,29B and that said openings are located in two longitudinal flanges 250,251 connected there between and forming an angle β there between comprised between 30 and 150°, such as about 90°. Such a diagonal member has a lower weight with respect to the diagonal member of FIG. 4.

The flat ends 23,27 of the diagonal member 2 have a total thickness E1 corresponding to about 2 times the thickness E of the plate or of the dissipative zone.

The openings 29A,29B have a substantially rectangular shape, the length LX thereof (in the longitudinal direction) being equal to about twice the width LY.

Such a diagonal member is provided with a series of successive dissipative zones undergoing plastic stretching when submitted to a seismic vibration with an effort or force higher than a predetermined effort or force. The horizontal members 3,4 are members undergoing substantially only elastic stretching when submitted to a seismic vibration with an effort or force up to a value at least equal to 1.3 times said predetermined effort or force.

As shown in FIG. 1, two adjacent columns are linked there between by a series of diagonal members 2, said diagonal members extending in a direction forming an angle α comprised between 15° and 75°, advantageously between 30° and 60°, for example about 45°, with respect to a horizontal plane. Two adjacent columns are connected there between with at least 4 diagonal members, preferably with at least 6 diagonal members.

According to a possible embodiment, only the portions of the columns adjacent to the ground level or the base or platform on which the structure is mounted are provided with diagonal members provided with dissipative zone(s).

In the shown embodiments, the diagonal members 2 form crosses, whereby the diagonal members of one cross are not attached the one to the other.

According to possible embodiments, two adjacent columns are connected to each other by two series of successive crosses made by diagonal members with dissipative zones, crosses of a first series having diagonal members forming a first angle with a horizontal plane, while crosses of the second series have diagonal members forming a second angle with a horizontal plane, said second angle being different from the first angle, while crosses of the first series and crosses of the second series extend between the same portions of two adjacent columns.

What I claim is:

1. Storage system comprising a metal structure, said metal structure comprising a plurality of vertical columns including first and second vertical columns linked one to the other by a plurality of horizontal members, and a plurality of diagonal members directly connected to respective ones of the vertical columns, whereby a first diagonal member and a second diagonal member of said plurality of diagonal members each include a first end, a second end and a central part, said central part including at least one dissipative zone capable of undergoing plastic stretching and functioning as a means for providing resistance to seismic vibrations, the first end of said first diagonal member being attached to said first vertical column and the second end of said first diagonal member being attached to the second vertical column, the first end of said second diagonal member being attached to said second vertical column and said second end of said second diagonal member being attached to said first vertical column, said storage system further comprising a first linking means and a second linking means, whereby the first linking means connects a portion of the first vertical column adjacent to the first end of the first diagonal member to a portion of the second vertical column adjacent to the first end of the second diagonal member, while said second linking means connects a portion of the second vertical column adjacent to the second end of the first diagonal to a portion of the first vertical column adjacent to the second end of the second diagonal, whereby said first and second ends of each of said first and second diagonal members are reinforced so that when a dissipative zone of a central part of a diagonal member undergoes plastic deformation, the first and second ends of said diagonal are only elastically deformed and are not detached from the respective first and second vertical columns, and whereby the first and second linking means are adapted for undergoing elastic deformation when at least one of said dissipative zones is undergoing plastic deformation.

2. The storage system of claim 1, in which the diagonal members are provided with at least one dissipative zone for undergoing plastic deformation when submitted to a seismic vibration with an effort higher than a predetermined effort, while the linking means are not provided with a dissipative zone for undergoing plastic deformation when submitted to a seismic vibration with an effort equal to 1.2 times said predetermined effort.

3. The storage system of claim 1, in which the diagonal members are provided with at least one dissipative zone for undergoing plastic deformation when submitted to a seismic vibration with an effort higher than a predetermined effort, while the horizontal members are members which undergo substantially only elastic deformation when submitted to a seismic vibration with an effort equal to 1.3 times said predetermined effort.

4. The storage system of claim 1, in which two adjacent columns are linked one to the other by at least four diagonal members each provided with at least one dissipative zone and by at least three linking means connecting one of said ends of each diagonal member to an end of another diagonal member.

5. The storage system of claim 1, in which all of the plurality of diagonal members are provided with at least one dissipative zone.

6. The storage system of claim 1, in which each diagonal member is provided with at least two dissipative zones distant from each other.

7. The storage system of claim 1, in which each of said plurality of diagonal members is a profile having a first end connected to a first vertical column, a second end connected to a second vertical column, and a longitudinal portion extending between said ends, whereby said first and second ends have a thickness which is greater than the thickness of the longitudinal portion.

8. The storage system of claim 1, in which each of said plurality of diagonal members is a profile having a first end connected to a first vertical column, a second end connected to a second vertical column, and a longitudinal portion extending between said ends, whereby each of said first and second ends corresponds to a folded portion of the profile, so that each said end is flattened and has a total thickness at least equal to about twice the thickness of the central part of the diagonal member.

9. The storage system of claim 1, in which each of said plurality of diagonal members is a profile having a first end connected to a first vertical column, a second end connected to a second vertical column, and a longitudinal portion extending between said ends, whereby each of said first and second ends corresponds to a folded portion of the profile, so that each of said ends is flattened and has a total thickness at least equal to about 3 times the thickness of the central part of the diagonal member.

10. The storage system of claim 1, in which at least one of the diagonal members is formed of a metal and in which the dissipative zone of said one diagonal member is formed by removing materials from the central part of the diagonal member at the place of said dissipative zone.

11. The storage system of claim 10, in which at least one of the diagonal members has a longitudinally extending central part with a cross section, whereby the dissipative zone is formed by removing at least 25% of the material in the cross section of the central part.

12. The storage system of claim 1, in which at least one of the diagonal members has a longitudinally extending central part with a defined length, whereby the dissipative zone extends on a major portion of the central part.

13. The storage system of claim 1, in which at least one of the diagonal members is a longitudinal profile, the ends of which are a folded portion of the profile, said portion being folded around at least an axis parallel to the longitudinal direction of the profile.

14. The storage system of claim 1, in which the profile has at least two longitudinal elements connected therebetween along a folding line, whereby said two longitudinal elements define therebetween an angle from 15° to 175° in the longitudinal portion extending between the two ends, while at said two ends, said two longitudinal elements are flattened so as to extend adjacent to each other.

15. The storage system of claim 1, in which each of said plurality of diagonal members is a profile having a first end connected to a one of said plurality of vertical columns and a second end connected to a different one of said plurality of vertical columns, and a central longitudinal portion extending between said ends, whereby the profile has at least two longitudinal elements connected therebetween by a longitudinal connecting elements, said two longitudinal elements being at least partly distant from each other in the central longitudinal portion, while being adjacent to each other at the ends.

16. The storage system of claim 1, in which each end of at least one of the plurality of diagonal members is flat and connected to a column by means of a single connecting element extending between one of said ends and the column.

17. The storage system of claim 1, in which the dissipative zone is a zone of the longitudinal central part which is provided with openings, whereby each opening having a maximum length measured parallel to the longitudinal direction of central part and a maximum width measured perpendicular to said longitudinal direction, the maximum length being at least equal to the maximum width.

18. The storage system of claim 1, in which at least one dissipative zone of the diagonal member is associated with a means for facilitating the detection of a plastic deformation.

19. The storage system of claim 18, in which the means for facilitating the detection of a plastic deformation is selected among the group consisting of marks distant from each other by a predetermined distance, films which can change of appearance when submitted to a plastic deformation, tapes, wires, sliding means, sliding means comprising one element connected to a first portion of the dissipative zone and another element connected to another portion of the dissipative zone whereby the first sliding element is adapted to slide with respect to the second sliding element, and combinations thereof.

20. The storage system of claim 1, wherein said diagonal members have a face and are directly connected to respective ones of said vertical columns, said vertical columns having a face, by means of connecting elements pushing a face of a portion of a respective diagonal member against a face of a vertical column.

21. A process for storing products in a storage system, comprising the steps of:

providing a metal structure having a plurality of vertical columns linked one to the other by a plurality of horizontal members, and a plurality of diagonal members directly connected to respective ones of said vertical columns, whereby a first diagonal member and a second diagonal member of said plurality of diagonal members each include a first end, a second end and a central part, said central part including at least one dissipative zone capable of undergoing plastic stretching and functioning as a means for providing resistance to seismic vibrations, the first end of said first diagonal member being attached to said first vertical column and the second end of said first diagonal member being attached to the second vertical column, the first end of said second diagonal member being attached to said second vertical column and said second end of said second diagonal member being attached to said first vertical column, said storage system further comprising a first linking means and a second linking means, whereby the first linking means connects a portion of the first vertical column adjacent to the first end of the first diagonal member to a portion of the second vertical column adjacent to the first end of the second diagonal member, while said second linking means connects a portion of the second vertical column adjacent to the second end of the first diagonal to a portion of the first vertical column adjacent to the second end of the second diagonal, whereby said first and second ends of each of said first and second diagonal members are reinforced so that when a dissipative zone of a central part of a diagonal member undergoes plastic deformation, the first and second ends of said diagonal are only elastically deformed and are not detached from the respective first and second vertical columns, and whereby the first and second linking means are adapted for undergoing elastic deformation when at least one of said dissipative zones is undergoing plastic deformation; and replacing those diagonal members which have undergone a plastic deformation in response to a seismic vibration with new diagonal members provided with at least one dissipative zone.

22. The process of claim 21, in which the diagonal members are provided with at least one dissipative zone for undergoing plastic deformation when submitted to a seismic vibration with an effort higher than a predetermined effort, while the linking means are not provided with a dissipative zone for undergoing plastic deformation when submitted to a seismic vibration with an effort equal to 1.2 times said predetermined effort.

23. The process of claim 21, in which the diagonal members are provided with at least one dissipative zone for undergoing plastic deformation when submitted to a seismic vibration with an effort higher than a predetermined effort, while the horizontal members are members which undergo substantially only elastic deformation when submitted to a seismic vibration with an effort equal to 1.3 times said predetermined effort.

24. The process of claim 21, in which each of said plurality of diagonal members is a profile having a first end connected to a first vertical column, a second end connected to a second vertical column, and a longitudinal portion extending between said ends, whereby each of said first and second ends corresponds to a folded portion of the profile, so that each said end is flattened and has a total thickness at least equal to about twice the thickness of the central part of the diagonal member.

25. The process of claim 21, in which at least one dissipative zone of the diagonal member is associated with a means for facilitating the detection of a plastic deformation.

26. The process of claim 25, in which the means for facilitating the detection of a plastic deformation is selected among the group consisting of marks distant from each other by a predetermined distance, films which can change of appearance when submitted to a plastic deformation, tapes, wires, sliding means, sliding means comprising one element connected to a first portion of the dissipative zone and another element connected to another portion of the dissipative zone, whereby the first sliding element is adapted to slide with respect to the second sliding element, and combinations thereof.

* * * * *